United States Patent
Yoshinaga et al.

(10) Patent No.: US 10,809,652 B2
(45) Date of Patent: Oct. 20, 2020

(54) FIXING DEVICE AND IMAGE FORMING APPARATUS INCORPORATING THE SAME

(71) Applicants: Hiroshi Yoshinaga, Chiba (JP);
Tomoya Adachi, Kanagawa (JP);
Yuusuke Furuichi, Kanagawa (JP);
Yukimichi Someya, Saitama (JP);
Mitsuko Sugano, Kanagawa (JP)

(72) Inventors: Hiroshi Yoshinaga, Chiba (JP);
Tomoya Adachi, Kanagawa (JP);
Yuusuke Furuichi, Kanagawa (JP);
Yukimichi Someya, Saitama (JP);
Mitsuko Sugano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/520,409

(22) Filed: Jul. 24, 2019

(65) Prior Publication Data

US 2020/0033776 A1 Jan. 30, 2020

(30) Foreign Application Priority Data

Jul. 27, 2018 (JP) .................................. 2018-141374
Mar. 4, 2019 (JP) .................................. 2019-038468

(51) Int. Cl.
*G03G 15/20* (2006.01)
*G01K 7/22* (2006.01)

(52) U.S. Cl.
CPC .......... *G03G 15/2053* (2013.01); *G01K 7/22* (2013.01); *G03G 2215/2038* (2013.01)

(58) Field of Classification Search
CPC .......... G03G 15/2039; G03G 15/2053; G03G 2215/2003; G03G 2215/2035; G03G 2215/2038; G01K 7/22
See application file for complete search history.

(56) References Cited

U.S. PATENT DOCUMENTS

| | | | |
|---|---|---|---|
| 6,248,978 B1 * | 6/2001 | Okuda | G03G 15/2064 219/216 |
| 2016/0252856 A1 * | 9/2016 | Suzuki | G03G 15/2053 399/329 |
| 2017/0285542 A1 | 10/2017 | Hase et al. | |
| 2017/0308009 A1 * | 10/2017 | Mochizuki | G03G 15/2039 |

(Continued)

FOREIGN PATENT DOCUMENTS

JP  2002-122489  4/2002

OTHER PUBLICATIONS

U.S. Appl. No. 16/285,733, filed Feb. 26, 2019, Yuusuke Furuichi, et al.

(Continued)

*Primary Examiner* — Sophia S Chen

(74) *Attorney, Agent, or Firm* — Oblon, McClelland, Maier & Neustadt, L.L.P.

(57) ABSTRACT

A fixing device includes a first rotator, a second rotator disposed opposite the first rotator to form a nip with the first rotator, a heater including a base and a heat generator, and a non-contact temperature detector to detect a temperature of the heater. The heater contacts an inner circumferential surface of the first rotator. The non-contact temperature detector is disposed opposite the inner circumferential surface of the first rotator via the base and disposed at a predetermined distance from the heater.

9 Claims, 7 Drawing Sheets

(56) References Cited

U.S. PATENT DOCUMENTS

| | | | |
|---|---|---|---|
| 2018/0011434 A1 | 1/2018 | Adachi | |
| 2018/0059587 A1 | 3/2018 | Sawada et al. | |
| 2018/0088501 A1* | 3/2018 | Maeda | G03G 15/2039 |
| 2018/0113404 A1* | 4/2018 | Yasukawa | G03G 15/205 |
| 2018/0120741 A1 | 5/2018 | Yoshinaga et al. | |
| 2018/0157198 A1 | 6/2018 | Seto et al. | |
| 2018/0173138 A1 | 6/2018 | Seki et al. | |
| 2018/0181037 A1* | 6/2018 | Kataoka | G03G 15/2053 |
| 2018/0203384 A1 | 7/2018 | Okamoto et al. | |
| 2018/0284669 A1 | 10/2018 | Fujimoto et al. | |
| 2018/0335733 A1 | 11/2018 | Matsuda et al. | |
| 2018/0348680 A1 | 12/2018 | Fujimoto et al. | |
| 2018/0356754 A1 | 12/2018 | Yoshinaga et al. | |
| 2018/0356755 A1 | 12/2018 | Hiroi et al. | |
| 2019/0179242 A1 | 6/2019 | Adachi et al. | |
| 2019/0196374 A1 | 6/2019 | Adachi et al. | |
| 2020/0019099 A1* | 1/2020 | Eiki | G03G 15/2053 |

OTHER PUBLICATIONS

U.S. Appl. No. 16/352,390, filed Mar. 13, 2019, Tomoya Adachi, et al.
U.S. Appl. No. 16/239,948, filed Jan. 4, 2019, Yoshiki Yamaguchi, et al.
U.S. Appl. No. 16/269,616, filed Feb. 7, 2019, Tomoya Adachi, et al.
U.S. Appl. No. 16/263,634, filed Jan. 31, 2019, Yuusuke Furuichi, et al.

* cited by examiner

FIXING DEVICE AND IMAGE FORMING APPARATUS INCORPORATING THE SAME

CROSS-REFERENCE TO RELATED APPLICATIONS

This patent application is based on and claims priority pursuant to 35 U.S.C. § 119 to Japanese Patent Applications No. 2018-141374, filed on Jul. 27, 2018 and No. 2019-038468, filed on Mar. 4, 2019 in the Japanese Patent Office, the entire disclosures of which are hereby incorporated by reference herein.

BACKGROUND

Technical Field

Embodiments of the present disclosure generally relate to a fixing device and an image forming apparatus incorporating the fixing device.

Background Art

Electrophotographic image forming apparatuses use various types of fixing devices. In one type of fixing device, a heater includes a base and a resistance heat generator and heats a thin fixing belt having a low thermal capacity. In the heater, the resistance heat generator is disposed on the base that is arranged in a width direction of the fixing belt. Such a fixing device includes a heating component that heats up when supplied with powered, a temperature detector that detects the temperature of the heating component, and a temperature control system to control the power supplied to the heating component based on the temperature detected by the temperature detector so that the temperature is maintained at a predetermined fixing temperature.

SUMMARY

This specification describes an improved fixing device that includes a first rotator, a second rotator disposed opposite the first rotator to form a nip with the first rotator, a heater including a base and a heat generator, and a non-contact temperature detector to detect a temperature of the heater. The heater contacts an inner circumferential surface of the first rotator. The non-contact temperature detector is disposed opposite the inner circumferential surface of the first rotator via the base and disposed at a predetermined distance from the heater.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
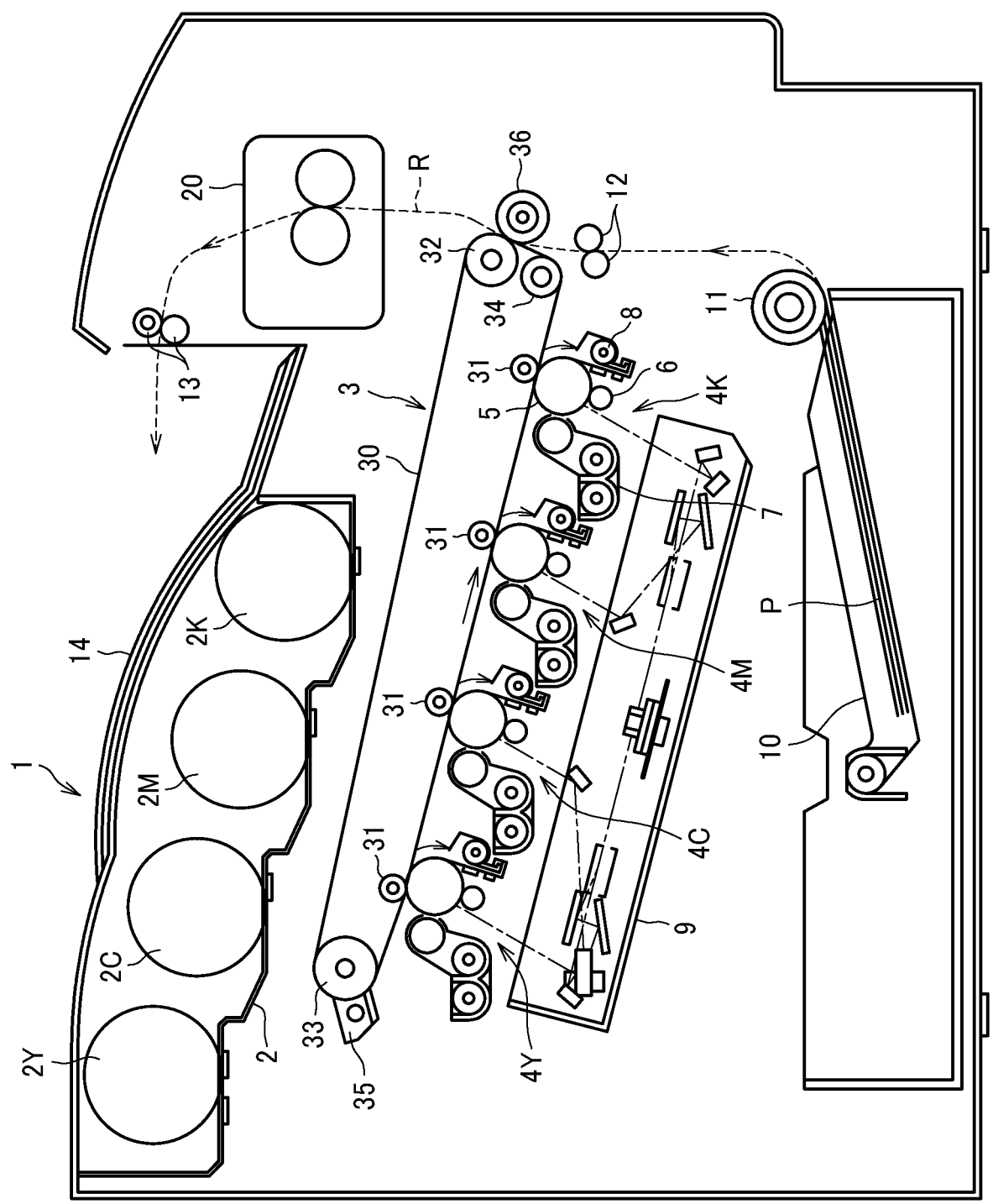
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference numbers are allocated to elements having the same function or shape and redundant descriptions thereof are omitted below.

As illustrated in FIG. 1, in the present embodiment, the image forming apparatus 1 is a color laser printer including four image forming devices 4Y, 4C, 4M, and 4K situated in a center portion of the image forming apparatus 1. The image forming devices 4Y, 4C, 4M, and 4K are aligned in a stretch direction in which an intermediate transfer belt 30 is stretched. Although the image forming devices 4Y, 4C, 4M, and 4K contain developers in different colors, that is, yellow (Y), cyan (C), magenta (M), and black (K) corresponding to color separation components of a color image (e.g., yellow, cyan, magenta, and black toners), respectively, the image forming devices 4Y, 4C, 4M, and 4K have an identical structure.

Specifically, each of the image forming devices 4Y, 4C, 4M, and 4K is an image station that includes a drum-shaped photoconductor 5 as a latent image bearer, a charger 6 to charge a surface of the photoconductor 5, a developing device 7 that supplies toner to an electrostatic latent image formed on the surface of the photoconductor 5, and a cleaner 8 that cleans the surface of the photoconductor 5. FIG. 1 illustrates reference numerals assigned to the photoconductor 5, the charger 6, the developing device 7, and the cleaner 8 of the image forming device 4K that forms a black toner image. However, reference numerals for the image forming devices 4Y, 4C, and 4M that form yellow, cyan, and magenta toner images, respectively, are omitted for convenience.

An exposure device 9 is disposed below the image forming devices 4Y, 4M, 4C, and 4K and exposes the outer circumferential surfaces of the respective photoconductors 5 with laser beams. The exposure device 9 includes a light source, a polygon mirror, an f-O lens, and a reflection mirror to irradiate the surface of the photoconductor 5 with a laser beam according to image data.

A transfer device 3 is disposed above the image forming devices 4Y, 4C, 4M, and 4K. The transfer device 3 includes the intermediate transfer belt 30 as a transfer body, four primary transfer rollers 31 as primary transfer devices, and a secondary transfer roller 36 as a secondary transfer device, a secondary transfer backup roller 32, a cleaning backup roller 33, a tension roller 34, and a belt cleaner 35.

The intermediate transfer belt 30 is an endless belt entrained around the secondary transfer backup roller 32, the cleaning backup roller 33, and the tension roller 34. In the present embodiment, as a driver drives and rotates the secondary transfer backup roller 32 counterclockwise, the intermediate transfer belt 30 rotates in a direction indicated by arrow in FIG. 1.

The four primary transfer rollers 31 sandwich the intermediate transfer belt 30 together with the four photoconductors 5, forming four primary transfer nips between the intermediate transfer belt 30 and the photoconductors 5, respectively. The primary transfer rollers 31 are coupled to a power supply situated inside the image forming apparatus 1. The power supply applies a predetermined direct current (DC) voltage and/or a predetermined alternating current (AC) voltage to each of the primary transfer rollers 31.

The secondary transfer backup roller 32 and the secondary transfer roller 36 press against each other via the intermediate transfer belt 30, and the contact portion therebetween is hereinafter referred to as a secondary transfer nip. Similar to the primary transfer rollers 31, the secondary transfer roller 36 is coupled to the power supply situated inside the image forming apparatus 1. The power supply applies at least one of a predetermined direct current (DC) voltage and a predetermined alternating current (AC) voltage to the secondary transfer roller 36.

The belt cleaner 35 includes a cleaning brush and a cleaning blade that contact an outer circumferential surface of the intermediate transfer belt 30.

A bottle holder 2 disposed in an upper portion of the image forming apparatus 1 accommodates four toner bottles 2Y, 2C, 2M, and 2K detachably attached to the bottle holder 2. The toner bottles 2Y, 2C, 2M, and 2K contain fresh yellow, cyan, magenta, and black toners to be supplied to the developing devices 7 of the image forming devices 4Y, 4C, 4M, and 4K, respectively. Toner supply tubes are interposed between the toner bottles 2Y, 2C, 2M, and 2K and the respective developing devices 7. The fresh toner is supplied from the toner bottles 2Y, 2C, 2M, and 2K to the respective developing devices 7 through the toner supply tubes.

In a lower portion of the image forming apparatus 1, the image forming apparatus 1 includes a sheet feeding tray 10 that loads a plurality of sheets P as recording media and a feed roller 11 that picks up and feeds a sheet P from the sheet feeding tray 10. Optionally, the image forming apparatus 1 may include a bypass feeder.

The image forming apparatus 1 includes a conveyance path R to convey the sheet P from the sheet feeding tray 10 to an output roller pair 13 via the secondary transfer nip. The output roller pair 13 ejects the sheet P outside the housing of the image forming apparatus 1. On the conveyance path R, a pair of registration rollers 12 as a conveyance device to convey the sheet P to the secondary transfer nip is disposed upstream from the secondary transfer roller 36 in the sheet conveyance direction.

Downstream from the secondary transfer roller 36 in the sheet conveyance direction, a fixing device 20 is disposed to fix an unfixed image transferred to the sheet P. On the conveyance path R downstream from the fixing device 20 in the sheet conveyance direction, an output roller pair 13 is disposed to eject the sheet P outside the image forming apparatus 1. To stack the sheet P ejected outside the image forming apparatus 1, an output tray 14 is disposed on a top surface of the image forming apparatus 1.

The image forming apparatus 1 basically operates as follows. When an image forming operation is started, the photoconductor 5 in each of the image forming devices 4Y, 4M, 4C, and 4K is driven to rotate clockwise in FIG. 1, and the charger 6 uniformly charges the surface of the photoconductor 5 in a predetermined polarity. The exposure device 9 emits laser beams onto the charged outer circumferential surfaces of the respective photoconductors 5, respectively, thus forming electrostatic latent images on the photoconductors 5. The image data used to expose the respective photoconductors 5 is monochrome image data produced by decomposing a desired full color image into yellow, cyan, magenta, and black image data. The developing devices 7 supply yellow, cyan, magenta, and black toners to the electrostatic latent images formed on the photoconductors 5, visualizing the electrostatic latent images as yellow, cyan, magenta, and black toner images, respectively.

Simultaneously, as the print job starts, the secondary transfer backup roller 32 is driven and rotated counterclockwise in FIG. 1, rotating the intermediate transfer belt 30 in a rotation direction illustrated in FIG. 1 by friction therebetween. Power supplies each apply a constant voltage or a constant current control voltage having a polarity opposite a polarity of the charged toner to each of the primary transfer rollers 31 to generate a transfer electric field at each primary transfer nip between each of the primary transfer rollers 31 and the corresponding photoconductor 5.

When the yellow, magenta, cyan, and black toner images formed on the photoconductors 5 reach the primary transfer nips, respectively, in accordance with rotation of the photoconductors 5, the yellow, magenta, cyan, and black toner images are primarily transferred from the photoconductors 5 onto the intermediate transfer belt 30 by the transfer electric field created at the primary transfer nips such that the yellow, magenta, cyan, and black toner images are superimposed successively on a same position on the intermediate transfer belt 30. Thus, a full color toner image is formed on the outer circumferential surface of the intermediate transfer belt 30. After the primary transfer of the yellow, cyan, magenta, and black toner images from the photoconductors 5 onto the intermediate transfer belt 30, the cleaners 8 remove residual toner failed to be transferred onto the intermediate transfer belt 30 and therefore remaining on the photoconductors 5 therefrom, respectively. Thereafter, dischargers discharge the outer circumferential surface of the respective photoconductors 5, initializing the surface potential thereof.

On the other hand, the feed roller 11 disposed in the lower portion of the image forming apparatus 1 is driven and rotated to feed the sheet P from the sheet feeding tray 10 toward the pair of registration rollers 12 through the conveyance path R. The pair of registration rollers 12 conveys the sheet P sent to the conveyance path R by the feed roller 11 to the secondary transfer nip formed between the secondary transfer roller 36 and the intermediate transfer belt 30 supported by the secondary transfer backup roller 32 at a proper time. At this time, the secondary transfer roller 36 is applied a transfer voltage of the polarity opposite the charged polarity of toner of the toner image on the intermediate transfer belt 30 to form a transfer electric field at the secondary transfer nip.

As the yellow, cyan, magenta, and black toner images constructing the full color toner image on the intermediate transfer belt 30 reach the secondary transfer nip in accordance with rotation of the intermediate transfer belt 30, the transfer electric field created at the secondary transfer nip secondarily transfers the yellow, cyan, magenta, and black toner images from the intermediate transfer belt 30 onto the sheet P collectively. After the secondary transfer of the full color toner image from the intermediate transfer belt 30 onto the sheet P, the belt cleaner 35 removes residual toner failed to be transferred onto the sheet P and therefore remaining on the intermediate transfer belt 30 therefrom. The removed toner is conveyed and collected into a waste toner container disposed inside the image forming apparatus 1.

Thereafter, the sheet P bearing the full color toner image is conveyed to the fixing device 20 that fixes the full color toner image on the sheet P. The sheet P bearing the fixed full color toner image is ejected by the output roller pair 13 onto the outside of the image forming apparatus 1, that is, the output tray 14 that stocks the sheet P.

The above describes the image forming operation of the image forming apparatus 1 to form the full color toner image on the sheet P. Alternatively, the image forming apparatus 1 may form a monochrome toner image by using any one of the four image forming devices 4Y, 4C, 4M, and 4K or may form a bicolor toner image or a tricolor toner image by using two or three of the image forming devices 4Y, 4C, 4M, and 4K.

Next, a description is given of the fixing device 20 according to the present embodiment of the present disclosure.

Figure 2:
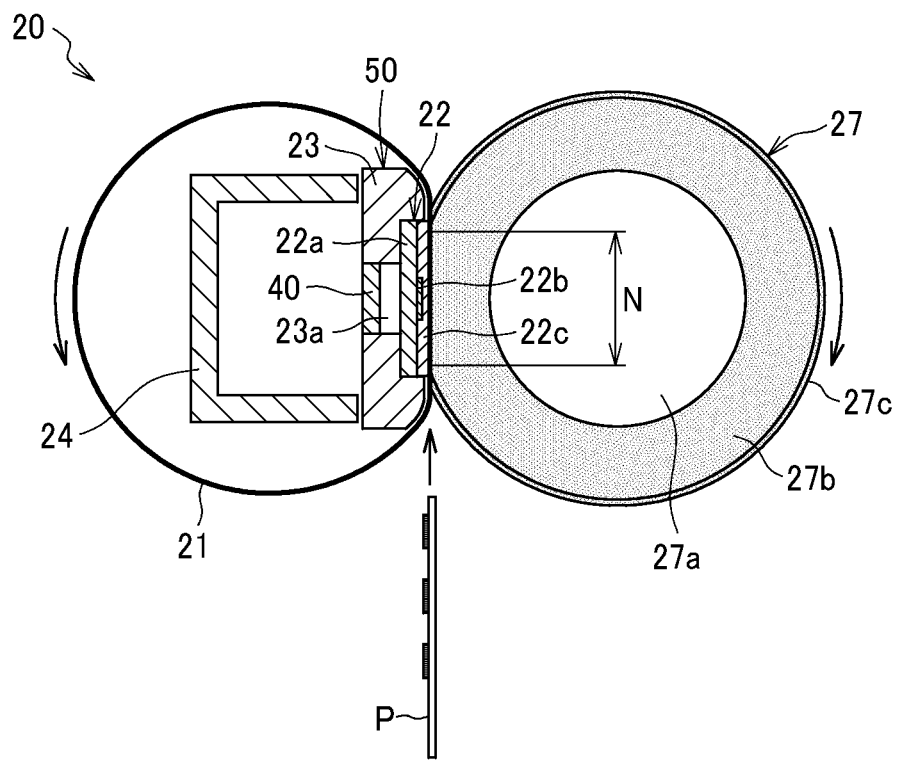
FIG. 2 is a cross-sectional view illustrating a fixing device according to the embodiment of the present disclosure.

As illustrated in FIG. 2, the fixing device 20 according to the present embodiment includes an endless fixing belt 21 as a first rotator or a fixing rotator, a pressure roller 27 as a second rotator or a pressure rotator to contact an outer circumferential surface of the fixing belt 21 and form a nip N, a stay 24, and a heating device 50.

The fixing belt 21 includes, for example, a tubular base made of polyimide (PI), the tubular base having an outer diameter of 25 mm and a thickness of from 40 to 120 μm. On the outermost layer of the fixing belt 21, a release layer made of a fluorine-based resin, such as a perfluoroalkoxy alkane (PFA) or polytetrafluoroethylene (PTFE), having a thickness of from 5 to 50 μm, is formed in order to improve durability and ensure releasability. An elastic layer made of rubber having a thickness of from 50 to 500 μm may be provided between the base and the release layer. The inner circumferential surface of the fixing belt 21 is applied with lubricant such as grease to improve slidability between the fixing belt 21 and a heater 22. Note that the tubular base of the fixing belt 21 is not limited to polyimide, and thus may be made of heat-resistant resin, such as polyetheretherketone (PEEK), or a metal, such as nickel (Ni) or stainless steel (SUS).

The pressure roller 27 having, for example, an outer diameter of 25 mm, includes a core made of a solid iron bar 27a, an elastic layer 27b on the surface of the bar 27a, and a release layer 27c formed on the outside of the elastic layer 27b. The elastic layer 27b is made of silicone rubber and has, for example, a thickness of 3.5 mm. Preferably, the release layer 27c is formed by a fluororesin layer having, for example, a thickness of approximately 40 μm on the surface of the elastic layer 27b to improve releasability.

The fixing belt 21 is formed in a tubular shape, extends in a width direction of the sheet to be conveyed, that is, in a direction perpendicular to paper in FIG. 2, and contacts the pressure roller 27 extending in the width direction of the sheet to form a fixing nip N extending in the width direction.

A biasing member presses the pressure roller 27 against the fixing belt 21, and the pressure roller 27 presses against the heater 22 via the fixing belt 21 to form the fixing nip N between the fixing belt 21 and the pressure roller 27. A driver drives and rotates the pressure roller 27 in a direction of an arrow illustrated in FIG. 2, and this rotation of the pressure roller 27 rotates the fixing belt 21.

The heating device 50 includes the heater 22 as a heater to heat the fixing belt 21, a heater holder 23 as a holder to hold the heater 22, and a thermistor 40 as a temperature detector.

The heater 22 is a planar heating member provided longitudinally in a width direction of the fixing belt 21 and heats the fixing belt 21 in the width direction. The heater 22 includes a planar base 22a, a resistance heat generator 22b disposed on the base 22a, and an insulation layer 22c covering the resistance heat generator 22b. The insulation layer 22c of the heater 22 contacts the inner circumferential surface of the fixing belt 21, and the heat generated from the resistance heat generator 22b is transmitted to the fixing belt 21 through the insulation layer 22c.

The heater holder 23 and the stay 24 are disposed inside the inner circumferential surface of the fixing belt 21 and extend in the width direction of the sheet.

The heater holder 23 holds the heater 22 contacting the inner circumferential surface of the fixing belt 21 and holds a thermistor 40 in an insertion hole 23a disposed in the heater holder 23.

The heater holder 23 is preferably made of heat-resistant material because heat from the heater 22 heats the heater holder 23 to a high temperature. The heater holder 23 made of heat-resistant resin having low thermal conduction, such as a liquid crystal polymer (LCP), reduces heat transfer from the heater 22 to the heater holder 23 and provides efficient heating of the fixing belt 21.

The stay 24 is a support member (a contact member) that contacts the back side of the heater holder 23 and supports the heater holder 23. The stay 24 is configured by a channeled metallic member, and both side plates of the fixing device 20 support both end portions of the stay 24. Supporting the heater holder 23 and the heater 22 held by the heater holder 23 by the stay 24 causes the heater 22 to reliably receive a pressing force of the pressure roller 27 while the pressure roller 27 presses the fixing belt 21 and forms the stable nip N.

When the print operation starts in the fixing device 20 according to the present embodiment, the pressure roller 27 is driven to rotate, and the fixing belt 21 starts to be rotated. Simultaneously, power is supplied to the resistance heat generator 22b in the heater 22, and the resistance heat generator 22b generates heat to heat the fixing belt 21. When the temperature of the fixing belt 21 reaches a predetermined target temperature called a fixing temperature, the sheet P bearing an unfixed toner image is conveyed to the nip N between the fixing belt 21 and the pressure roller 27, and the unfixed toner image is heated and pressed on to the sheet P and fixed thereon.

Next, a non-contact temperature detector disposed in the fixing device is described. In the present embodiment, the non-contact temperature detector is a thermistor.

Figure 3:
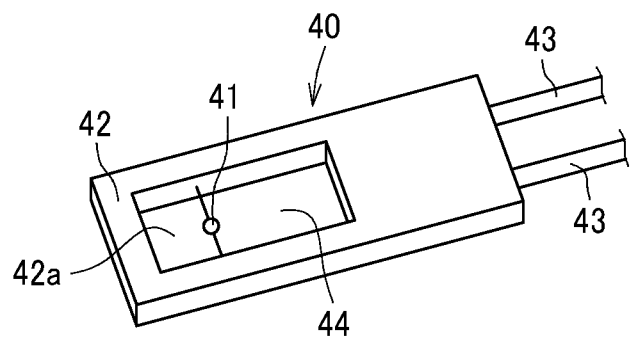
FIG. 3 is a perspective view illustrating a configuration of a thermistor.

As illustrated in FIG. 3, the thermistor 40 includes a heat sensitive element 41, a frame 42, lead wires 43, and a heat-resistant film 44.

The frame 42 is made of an insulation material, and in the present embodiment, is made of resin. The frame 42 has an opening 42a that is a through-hole penetrating the frame 42.

The pair of lead wires 43 extending from the inside of the frame 42 holds the heat sensitive element 41 at a position substantially in the center of the opening 42a in a width direction of the opening 42a. The heat sensitive element 41 is coated with infrared ray absorbing glass on the outer peripheral surface thereof. In addition to the heat sensitive element according to the present embodiment, the heat sensitive element may be a known thermistor such as a diode-type thermistor, a bead-type thermistor, a chip thermistor, a thin film thermistor as appropriate.

Two lead wires 43 extend from one end side of the frame 42 to the outside thereof to connect the thermistor 40 to a temperature detection circuit outside the thermistor 40. The lead wires 43 are electrically coupled to the heat sensitive element 41 via a metal plate and a lead wire that are disposed inside the frame 42 and a lead wire.

The heat-resistant film 44 is attached to the bottom surface of the frame 42, that is, the back side of the paper in FIG. 3 and covers the bottom surface side of the opening 42a. The heat-resistant film 44 is made of, for example, a polyimide resin.

Figure 4:
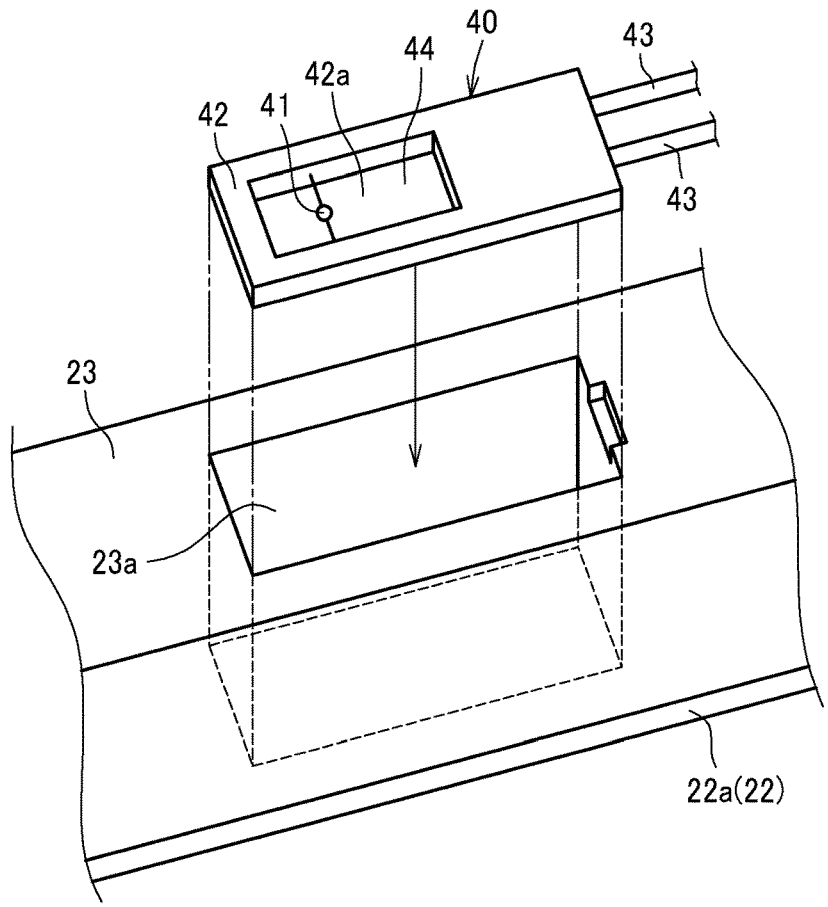
FIG. 4 is a perspective view illustrating how the thermistor is attached to the fixing device.

As illustrated in FIG. 4, the heater holder 23 has the insertion hole 23a to insert the thermistor 40. The insertion hole 23a is a through-hole in the heater holder penetrating from the side of the stay 24 to the side of the heater 22 as illustrated in FIG. 2 and positioned opposite the resistance heat generator 22b and in a center portion of the heater holder 23 in the width direction of the sheet, that is, the direction perpendicular to the paper in FIG. 2.

Figure 5:
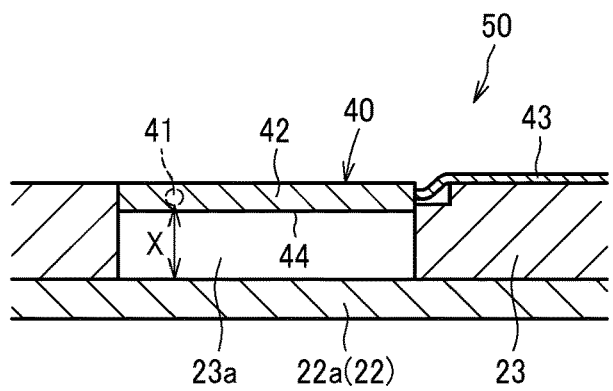
FIG. 5 is a cross-sectional view illustrating the thermistor attached to the fixing device.

As illustrated in FIG. 5, the thermistor 40 is inserted into and fixed in the insertion hole 23a to the heater holder 23 at an upper portion of the insertion hole 23a in FIG. 5 using an appropriate method and sets a gap that is a distance X between the heat sensitive element 41 and the surface of the base 22a on the side of the thermistor 40. In other words, the heater holder 23 holds the thermistor 40 and serves to provide the distance X between the thermistor 40 and the heater 22. Providing the heat-resistant film 44 between the thermistor 40 and the heater 22 prevents the heat sensitive element 41 from being overheated and damaged. The lead wires 43 are disposed along the surface of the heater holder 23 and extend to the outside.

By attaching the thermistor 40 to the heater holder 23, the thermistor 40 covers the insertion hole 23a from the upper side in FIG. 5. Further, the lower side of the insertion hole 23a in FIG. 5 is covered by the base 22a contacting the heater holder 23. That is, the portion with the insertion hole 23a is surrounded by the base 22a, the heater holder 23, and the thermistor 40 and forms an enclosed space.

When the print operation starts, and power is supplied to the resistance heat generator 22b in FIG. 2, heat from the resistance heat generator 22b is transmitted to the thermistor 40 through the base 22a. In the insertion hole 23a, the thermistor 40 is heated by radiation heat from the heater 22, convection of air, and heat transfer through the air. This temperature rise enables the thermistor 40 to detect the temperature rise caused by the heater 22. Since the heater holder 23 positions the thermistor 40 at a predetermined distance, for example, the distance X in the present embodiment from the heater 22, the detection accuracy of the thermistor 40 is stable.

The distance X is preferably set in the range of 0.5 to 3.0 mm. When the distance X is shorter than 0.5 mm, the heat sensitive element 41 comes too close to the resistance heat generator 22b, resulting in overheating, and the thermistor 40 may be damaged. When the distance X is longer than 3.0 mm, the detection accuracy of the thermistor 40 may be reduced. Setting the distance X in the above-described range prevents damage to the thermistor 40 due to overheating and secures the detection accuracy of the thermistor 40.

Additionally, in the present embodiment, forming the enclosed space in the insertion hole 23a prevents air from flowing into the insertion hole 23a from the outside. For example, when fresh air flows into the insertion hole 23a, heat exchange with the outside occurs, and heat transfer from the heater 22 to the thermistor 40 is partially inhibited. Preventing air from flowing into the insertion hole 23a from the outside prevents fresh air flow from affecting heat transfer from the heater 22 to the thermistor 40. As a result, the thermistor 40 accurately detects the temperature rise caused by the resistance heat generator 22b.

The enclosed space described above is not limited to a space in a completely sealed state. For example, although tolerances may generate a slight gap between the thermistor 40 and the heater holder 23, the space formed in the insertion hole 23a substantially prevents air from flowing into the insertion hole 23a from the outside as the enclosed space, and the thermistor 40 can still accurately detect the temperature rise of the heater 22. As described above, formation of the space surrounded by the base 22a of the heater 22, the heater holder 23, and the thermistor 40 improves accuracy of the thermistor 40.

The fixing device using a contact-type temperature detector includes a biasing member that presses the contact-type temperature detector to contact the heater 22 and an elastic body interposed between the temperature detector and the heater to reduce pressure from the contact-type temperature detector to the heater 22. However, use of the non-contact type thermistor 40 of the present embodiment does not need an above-described configuration and reduce a number of parts of the fixing device.

Additionally, in the use of the contact-type temperature detector, lubricant that is grease in the present embodiment applied to the inner circumferential surface of the fixing belt 21 may move to the elastic body, and as a result, the accuracy of the contact-type temperature detector may be degraded. However, use of the non-contact type thermistor 40 of the present embodiment does not cause such deterioration of the accuracy.

Next, an embodiment of a fixing device different from the above-described fixing device is described with reference to FIG. 6.

Figure 6:
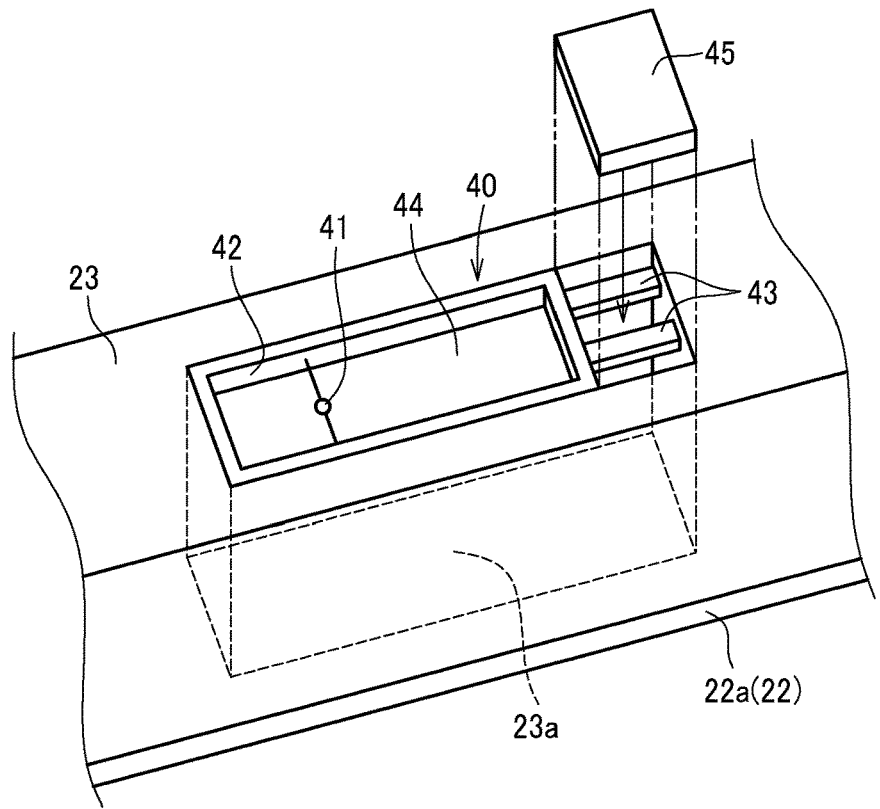
FIG. 6 is a perspective view illustrating a fixing device according to another embodiment.

As illustrated in FIG. 6, in the fixing device of the present embodiment, the thermistor 40 and a part of the lead wires 43 are inserted into the insertion hole 23a. The other part of the lead wires 43 is embedded in the heater holder 23 but may be disposed along the surface of the heater holder 23 as described above embodiment.

In the configuration of the present embodiment, since both the heat sensitive element 41 and the lead wire 43 are disposed in the insertion hole 23a, the heat sensitive element 41 and the lead wire 43 receive heat in the same space when the heater 22 starts heating, and the heat is transmitted into the insertion hole 23a. Thereby, heat quantities received by the heat sensitive element 41 and the lead wire 43 are substantially the same. A temperature difference between the heat sensitive element 41 and the lead wire 43 when the thermistor 40 detects the temperature of the heater 22 causes heat transfer between them, which adversely affects the response of the thermistor 40 to temperature change of the heater 22. In the present embodiment, setting the heat sensitive element 41 and the lead wire 43 in the same space reduces the temperature difference generated between the heat sensitive element 41 and the lead wire 43 and improves the response of the thermistor 40 to the temperature change of the heater 22. The temperature difference between the heat sensitive element 41 and the lead wire 43 is preferably 20° C. or less.

Additionally, in the present embodiment, a cover 45 covers above the lead wire 43. The cover 45 is fitted to the heater holder 23 and covers a portion of the insertion hole 23a other than the portion covered by the frame 42. As a result, the inside of the insertion hole 23a becomes the enclosed space that hinders movement of air with the outside and improves the temperature detection accuracy of the thermistor 40.

To design the temperature difference between the heat sensitive element 41 and the lead wire 43 as small as possible, for example, it is preferable to make the distances from the base 22a to the heat sensitive element 41 and the lead wire 43 as equal as possible. The term "distance" as used herein means a distance in a direction in which the pressure roller 27 presses the fixing belt 21, that is, the distance X in FIG. 5. Making the distances from the base 22a to the heat sensitive element 41 and the lead wire 43 equal means setting the distance from base 22a to the lead wire 43 to the distance X in FIG. 5. The difference in the distance between the heat sensitive element 41 and the lead wire 43 with respect to the base 22a is preferably 1.0 mm or less. This can minimize the temperature difference generated between the heat sensitive element 41 and the lead wire 43.

Note that structures to set the temperature difference between the heat sensitive element 41 and the lead wire 43 as small as possible are not limited the above-described structure, the distances from the heater 22 to the heat sensitive element 41 and the lead wire 43 or thermal capacities of the heat sensitive element 41 and the lead wire 43 may be changed suitably. As a method of changing the thermal capacity, for example, the lead wire 43 may be coated by a coating material for increased thermal capacity. Specifically, a suitable material and a suitable thickness of the coating material can be determined through experiments of measuring temperatures of the heat sensitive element 41 and the lead wires 43 coated with coating materials having of various kinds of materials and thicknesses. For example, the material may be silicon rubber that satisfies UL3367, and the thickness of the coating material may be a diameter of approximately 1 mm that includes the entire lead wire 43.

Figure 7:
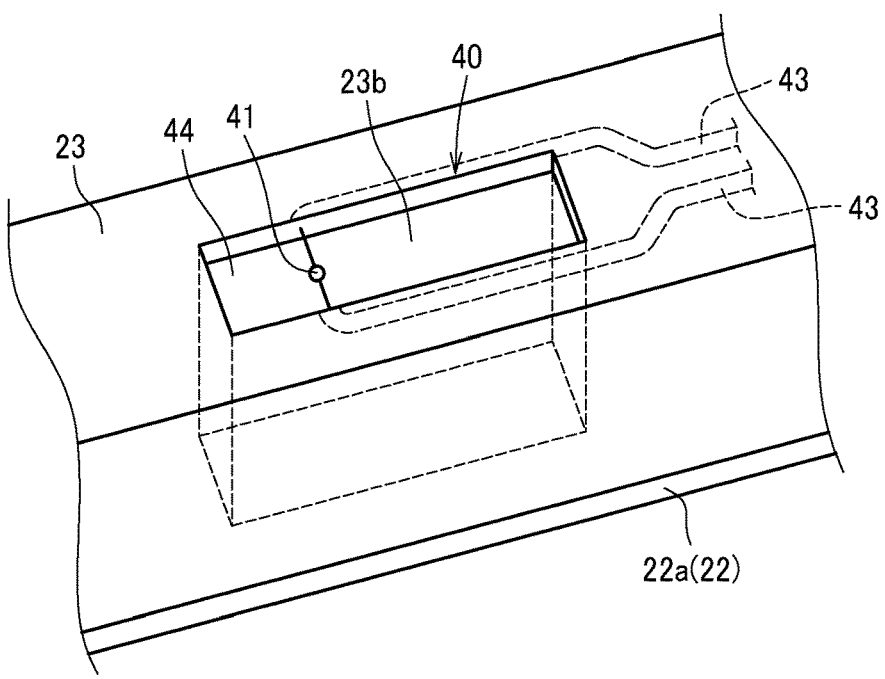
FIG. 7 is a perspective view illustrating a fixing device according to still another embodiment.

The thermistor 40 may be incorporated in advance in the heater holder 23 in addition to the configuration in which the thermistor 40 is attached to the heater holder 23 as in the above embodiment. Specifically, as illustrated in FIG. 7, the heater holder 23 may have a hole 23b in which the thermistor 40, that is, the heat sensitive element 41 is disposed. Specifically, the heater holder 23 holds the heat sensitive element 41 in the hole 23b via the lead wire. The lead wire 43 is embedded in the heater holder 23, as illustrated by dotted lines in FIG. 7. Similar to the above-described embodiments, the heat-resistant film 44 is disposed between the heat sensitive element 41 and the base 22a.

As in the present embodiment, incorporating the thermistor 40 in the heater holder 23 in advance accurately positions the heat sensitive element 41 in the heater holder 23 and stabilizes the quality of temperature detection of the thermistor 40. Additionally, the configuration in the present embodiment makes the hole 23b more completely enclosed space than the configuration in which the thermistor 40 is attached to the heater holder because a gap may be generated between the thermistor 40 and the heater holder 23. Furthermore, incorporating the thermistor 40 in the heater holder 23 and making them as a single member reduces a number of parts.

The present disclosure is not limited to the details of the embodiments described above and various modifications and improvements are possible.

Figure 8:
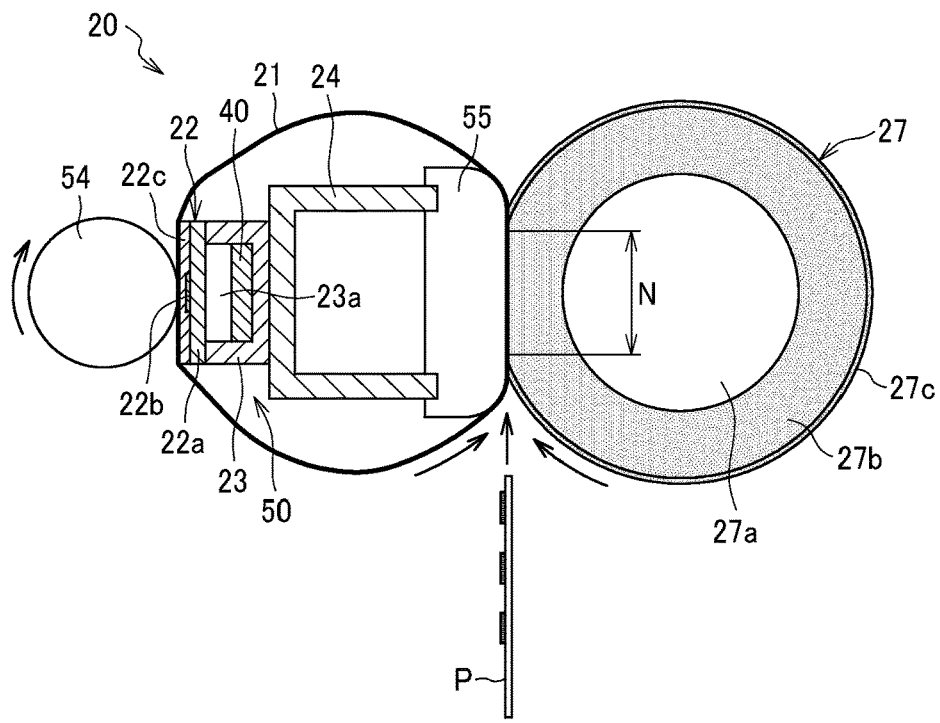
FIG. 8 is a schematic diagram illustrating a configuration of another fixing device.
Figure 9:
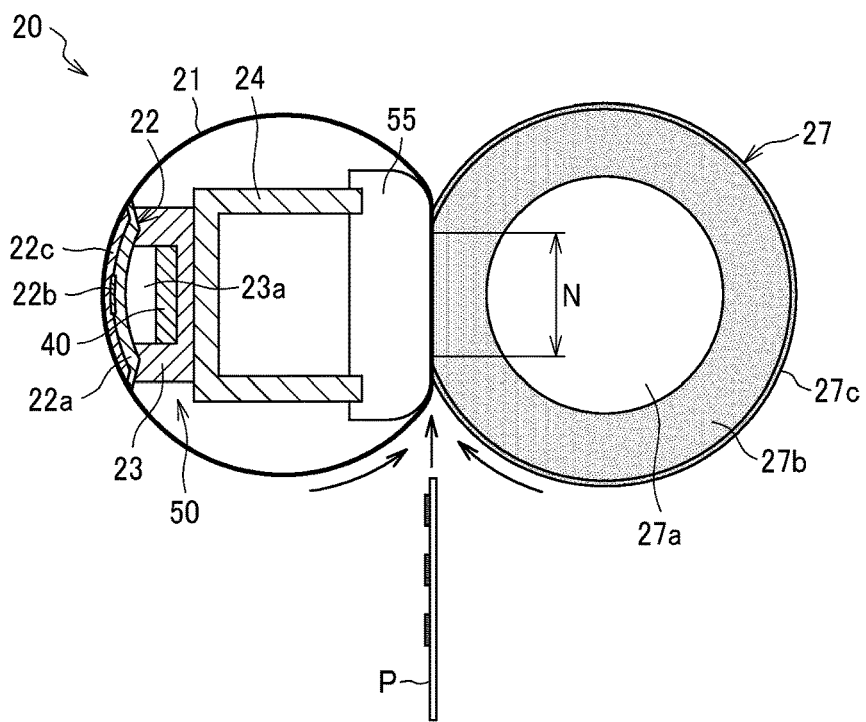
FIG. 9 is a schematic diagram illustrating a configuration of still another fixing device.
Figure 10:
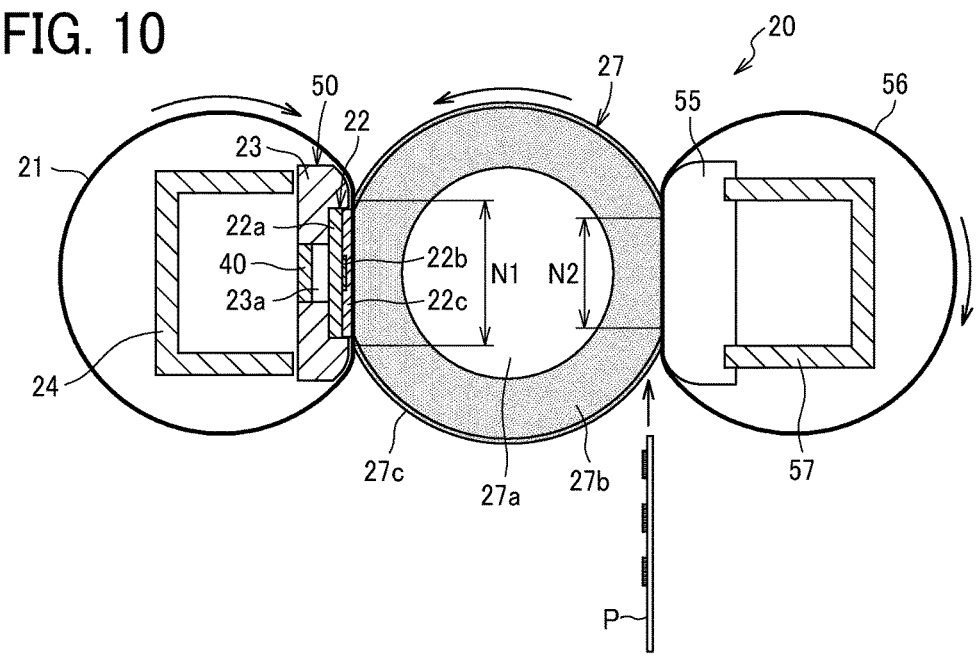
FIG. 10 is a schematic diagram illustrating a configuration of still yet another fixing device.

The present disclosure is also applicable, for example, to fixing devices as illustrated in FIGS. 8 to 10, in addition to the fixing device illustrated in FIG. 2. The configurations of fixing devices illustrated in FIGS. 8 to 10 are briefly described below.

First, the fixing device 20 illustrated in FIG. 8 includes a pressurization roller 54 opposite the pressure roller 27 with respect to the fixing belt 21 and heats the fixing belt 21 sandwiched by the pressurization roller 54 and the heater 22. On the other hand, in the side of the pressure roller 27, a nip formation pad 55 is disposed inside the inner circumferential surface of the fixing belt 21. The stay 24 supports the nip formation pad 55, and the nip formation pad 55 and the pressure roller 27 sandwiches the fixing belt 21 to form the nip N.

Next, the fixing device 20 illustrated in FIG. 9 is omitted the above described pressurization roller 54 and includes the heater 22 formed to be are having a curvature of the fixing belt 21 to keep a circumferential contact length between the fixing belt 21 and the heater 22. Other parts of the fixing device 20 illustrated in FIG. 9 are the same as the fixing device 20 illustrated in FIG. 2.

Lastly, the fixing device 20 illustrated in FIG. 10 includes a pressing belt 56 in addition to the fixing belt 21 and has a heating nip (a first nip) N1 and the fixing nip (a second nip) N2 separately. That is, the nip formation pad 55 and the stay 57 are disposed opposite the fixing belt 21 with respect to the pressure roller 27, and the pressing belt 56 is rotatably arranged to wrap around the nip formation pad 55 and the stay 57. The sheet P passes through the fixing nip N2 between the pressing belt 56 and the pressure roller 27 and is subjected to heat and pressure, and the image is fixed on the sheet P. Other parts of the fixing device 20 illustrated in FIG. 10 are the same as the fixing device 20 illustrated in FIG. 2.

In the above described fixing devices 20, holding the thermistor 40 at the position in a certain distance from the heater 22 stabilizes the detection accuracy of the thermistor 40 and enables suitable control in the temperature of the fixing belt 21.

The image forming apparatus 1 according to the present embodiment of this disclosure is applicable not only to a color image forming apparatus illustrated in FIG. 1 but also to a monochrome image forming apparatus, a copier, printer, facsimile machine, or multifunction printer including at least two functions of the copier, printer, and facsimile machine.

Figure 11:
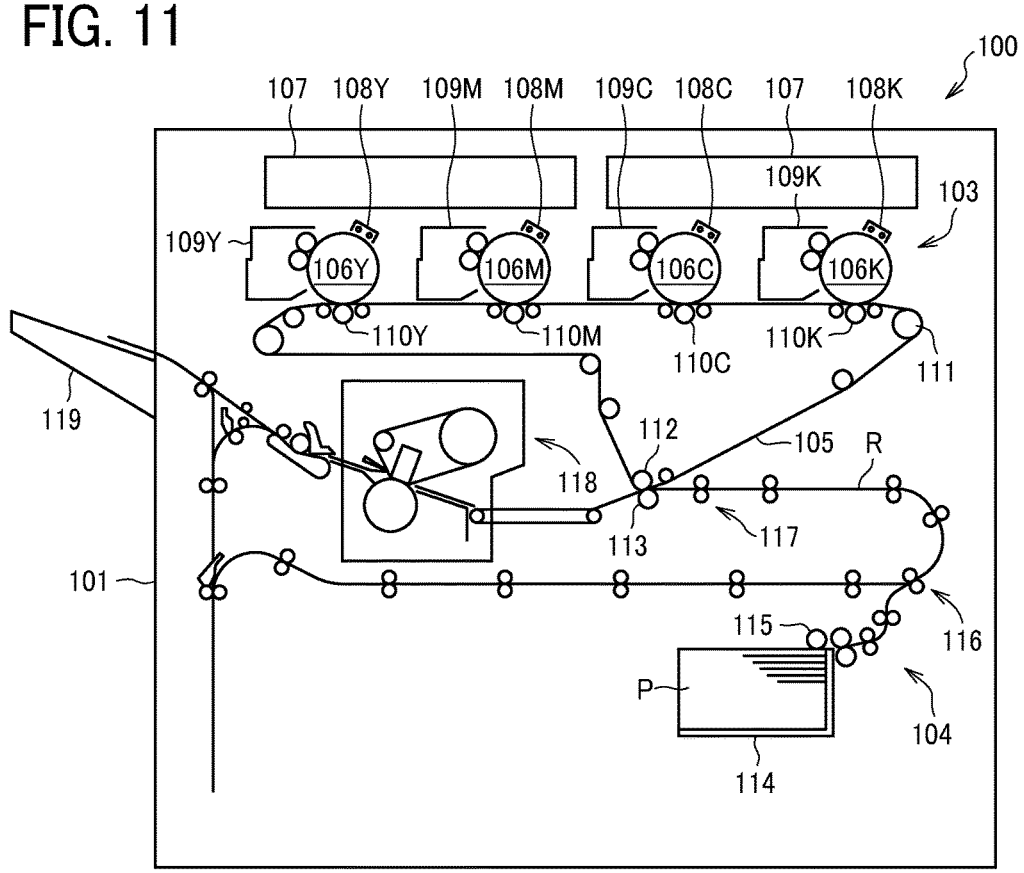
FIG. 11 is a schematic diagram illustrating a configuration of another image forming apparatus.
Figure 12:
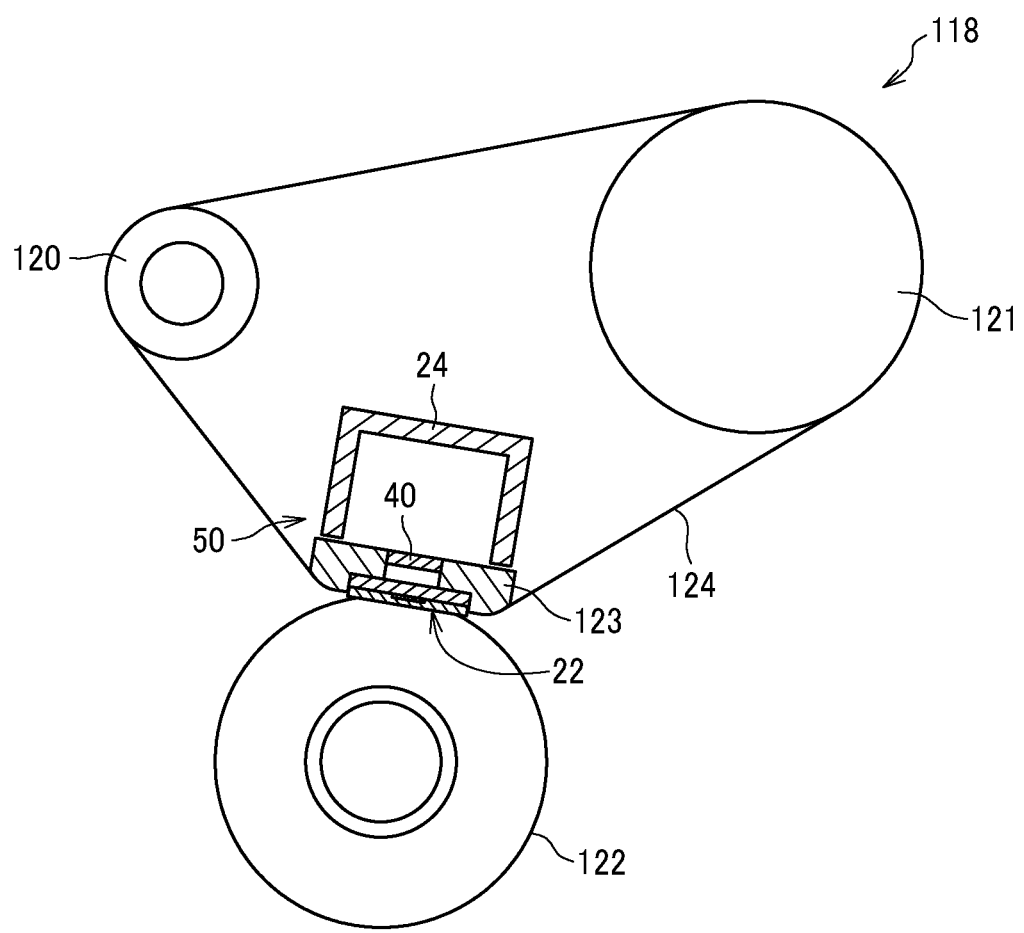
FIG. 12 is a schematic diagram illustrating a configuration of the fixing device installed in the image forming apparatus in FIG. 11.

The fixing device according to the present disclosure may be a fixing device configured as illustrated in FIG. 12 disposed in an image forming apparatus illustrated in FIG. 11.

As illustrated in FIG. 11, a copier 100 as the image forming apparatus includes an image forming device 103 situated in a center portion of a main body 101, a sheet feeder 104 situated below the image forming device 103, and an image reader situated above the image forming device 103. The image forming device 103 includes a rotatable intermediate transfer belt 105 having a transfer surface extending in the horizontal direction and image bearers on the intermediate transfer belt 105. The image bearers can bear color toner images on their surface, which are yellow, magenta, cyan, and black colors complementary to each other.

The photoconductor drums 106Y, 106M, 106C, and 106K that are image bearers configured to be rotatable counterclockwise are arranged in parallel along the transfer surface of the intermediate transfer belt 105. Each of the photoconductor drums is surrounded by chargers 108Y, 108M, 108C and 108K, developing devices 109Y, 109M, 109C, and 109K, primary transfer rollers 110Y, 110M, 110C, and 110K, and cleaners, respectively, and optical writing devices 107 are disposed near the photoconductor drums as illustrated in FIG. 11, which perform image formation processes when the photoconductor drums rotate. The developing devices 109Y, 109M, 109C, and 109K contain yellow, magenta, cyan, and black toner, respectively.

The intermediate transfer belt 105 is stretched by a drive roller 111 and multiple driven rollers including a secondary transfer backup roller 112, and the secondary transfer roller 113 is disposed opposite the secondary transfer backup roller 112 via the intermediate transfer belt 105. On the other hand, the sheet P as a recording medium loaded in the sheet feeding tray 114 disposed in the sheet feeder 104 is fed by a sheet feeding roller 115 and conveyed to a registration roller pair 117 on a conveyance passage R by a conveyance roller pair 116. The registration roller pair 117 temporally stops the conveyed sheet P and, timed to coincide with the arrival of an image on the intermediate transfer belt 105, feeds the sheet P to the secondary transfer roller 113.

A description is provided of an image forming operation to form a toner image on a sheet P that is performed by the copier 100 having the construction described above. Firstly, the charger 108Y uniformly charges a surface of the photoconductor drum 106Y. The optical writing device 107 forms an electrostatic latent image on the photoconductor drum 106Y according to image data sent from an image reader. The developing device 109Y containing yellow toner visualizes the electrostatic latent image into a yellow toner image. The primary transfer roller 110Y applied with a predetermined bias primarily transfers the yellow toner image onto the intermediate transfer belt 105.

Similarly, magenta, cyan, and black toner images are formed on the photoconductor drums 106M, 106C, and 106K, respectively, and primarily transferred onto the intermediate transfer belt 105 successively by an electrostatic force such that the yellow, magenta, cyan, and black toner images are superimposed on a same position on the intermediate transfer belt 105, thus forming a full color toner image on the intermediate transfer belt 105. The full color toner image formed as described above on the intermediate transfer belt 105 is together transferred onto the sheet P fed from the sheet feeder 104 at a secondary transfer nip that is a contact portion between the secondary transfer backup roller 112 and the secondary transfer roller 113. The sheet P bearing the toner image is conveyed to the fixing device 118 in which a fixing belt and a pressure roller fix the toner image on the sheet P under heat and pressure. Thereafter, the sheet P bearing the fixed toner image is ejected onto an output tray 119 that stacks the sheet P.

As illustrated in FIG. 12, the fixing device 118 includes a drive roller 120, a driven roller 121, a pressure roller 122 as a second rotator or a pressure rotator, a pressure pad 123 as a nip formation pad, and a fixing belt 124 as a first rotator or a fixing rotator. The drive roller 120 having a high friction resistance member such as rubber on the outer peripheral surface is rotatably supported by side plates of the fixing device 118 and driven by a motor to move the fixing belt 124 in the same direction, which is a clockwise direction in FIG. 12, as a direction in which the sheet P is conveyed.

The driven roller 121 made of aluminum or iron is rotatably supported by the side plates of the fixing device 118 and is driven to rotate as the fixing belt 124 rotates. The pressure roller 122 is disposed below the drive roller 120 and the driven roller 121. The pressure roller 122 is rotatably supported by the side plates of the fixing device 118, driven to rotate as the fixing belt 124 rotates, and presses the sheet P by a pressing force of a pressing member.

The heating device 50 and the stay 24 are disposed opposite the pressure roller 122 via the fixing belt 124. As in the above-described embodiment, controlling the heating amount of the heater 22 based on the temperature detected by the thermistor 40 can heat and maintain the fixing belt 124 to the target temperature.

The fixing belt 124 is stretched around the drive roller 120, the driven roller 121, and the heating device 50 with a predetermined tension and formed to be a double layered structure constructed of a base layer having a thickness of 300 to 500 μm and made of nickel, stainless steel, polyimide, or the like and an elastic layer made of silicone rubber or the like.

In the above described fixing device 118 disposed in the image forming apparatus, holding the thermistor 40 at the position in a certain distance from the heater 22 stabilizes the detection accuracy of the thermistor 40 and enables suitable control in the temperature of the fixing belt 21.

The sheets P serving as recording media may be thick paper, postcards, envelopes, plain paper, thin paper, coated paper, art paper, tracing paper, overhead projector (OHP) transparencies, plastic film, prepreg, copper foil, and the like.

Although the thermistor configured as illustrated in FIG. 3 is applied as the non-contact temperature detector in the above embodiment, the present disclosure is not limited to this. For example, the temperature detector may be a non-contact temperature sensor, that is, a non-contact (NC) sensor. However, the thermistor 40 of the present embodiment is preferable because it is excellent in heat resistance. Alternatively, the temperature detector may be a thermostat.

In the above embodiments, an example of the heating device of the present disclosure is the heating device to heat the fixing belt in the fixing device. However, the heating device of the present disclosure may also be applied to a drying device to dry a material to be dried. For example, in an inkjet type image forming apparatus, the heating device of the present disclosure may be applied to a drying device that dries an ink image formed on the surface of the recording medium such as the sheet.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A fixing device, comprising:
a first rotator;
a second rotator disposed opposite the first rotator to form a nip with the first rotator;
a heater including a base and a heat generator, the heater contacting an inner circumferential surface of the first rotator;
a holder extending in a width direction of the first rotator and disposed inside the inner circumferential surface of the first rotator to hold the heater in the width direction; and
a non-contact temperature detector to detect a temperature of the heater, the non- contact temperature detector disposed opposite the inner circumferential surface of the first rotator via the base and disposed at a predetermined distance from the heater,
wherein the first rotator includes an enclosed space enclosed by the holder, the heater, and the non-contact temperature detector.

2. The fixing device according to claim I, further comprising a lead wire to electrically connect the non-contact temperature detector to an outside of the non- contact temperature detector,
wherein a part of the lead wire is within the enclosed space.

3. The fixing device according to claim I, further comprising a lead wire to electrically connect the non-contact temperature detector to an outside of the non- contact temperature detector,
wherein the non-contact temperature detector includes a heat sensitive element to detect the temperature, and
wherein the heat sensitive element and the lead wire are incorporated in the holder.

4. An image forming apparatus comprising the fixing device according to claim 1.

5. A fixing device comprising:
a first rotator;
a second rotator disposed opposite the first rotator to form a nip with the first rotator;
a heater including a base and a heat generator, the heater contacting an inner circumferential surface of the first rotator; and
a non-contact temperature detector to detect a temperature of the heater,the non- contact temperature detector disposed opposite the inner circumferential surface of the first rotator via the base and disposed at a predetermined distance from the heater, wherein the fixing device further comprises a lead wire to electrically connect the non- contact temperature detector to an outside of the non-contact temperature detector,
wherein the non-contact temperature detector includes a heat sensitive element to detect the temperature, and
wherein a thermal capacity of the heat sensitive element, a thermal capacity of the lead wire, a distance from the heater to the heat sensitive element, and a distance from the heater to the lead wire are set so that a temperature of the heat sensitive element and a temperature of the lead wire become substantially same when the heater generates heat.

6. The fixing device according to claim 5, wherein the distance from the heater to the heat sensitive element is substantially equal to the distance from the heater to the lead wire.

7. The fixing device according to claim 5, wherein the lead wire is coated with a coating material.

8. A fixing device, comprising:
a first rotator;
a second rotator disposed opposite the first rotator to form a nip with the first rotator;
a heater including a base and a heat generator, the heater contacting an inner circumferential surface of the first rotator;
a temperature detector including a heat sensitive element to detect a temperature of the heater;
a lead wire to electrically connect the temperature detector to an outside of the temperature detector; and
a holder to hold the temperature detector, wherein the temperature detector is integrated into the holder, the lead wire is embedded in the holder, and the holder is configured as a single unit with the temperature detector.

9. The fixing device of claim 8, wherein the holder holds the heater in a longitudinal direction of the heater.

* * * * *